Jan. 25, 1949.
B. A. SWENNES ET AL
2,459,975
WHEELS FOR ENDLESS TRACK VEHICLES AND
METHOD FOR MOUNTING SAME
Filed April 5, 1944
3 Sheets-Sheet 1
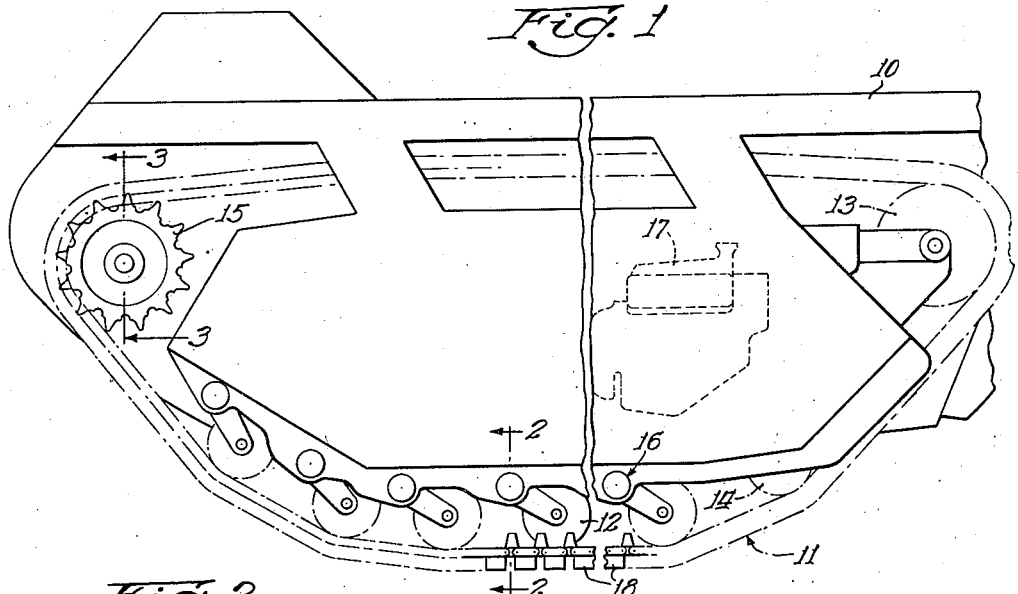
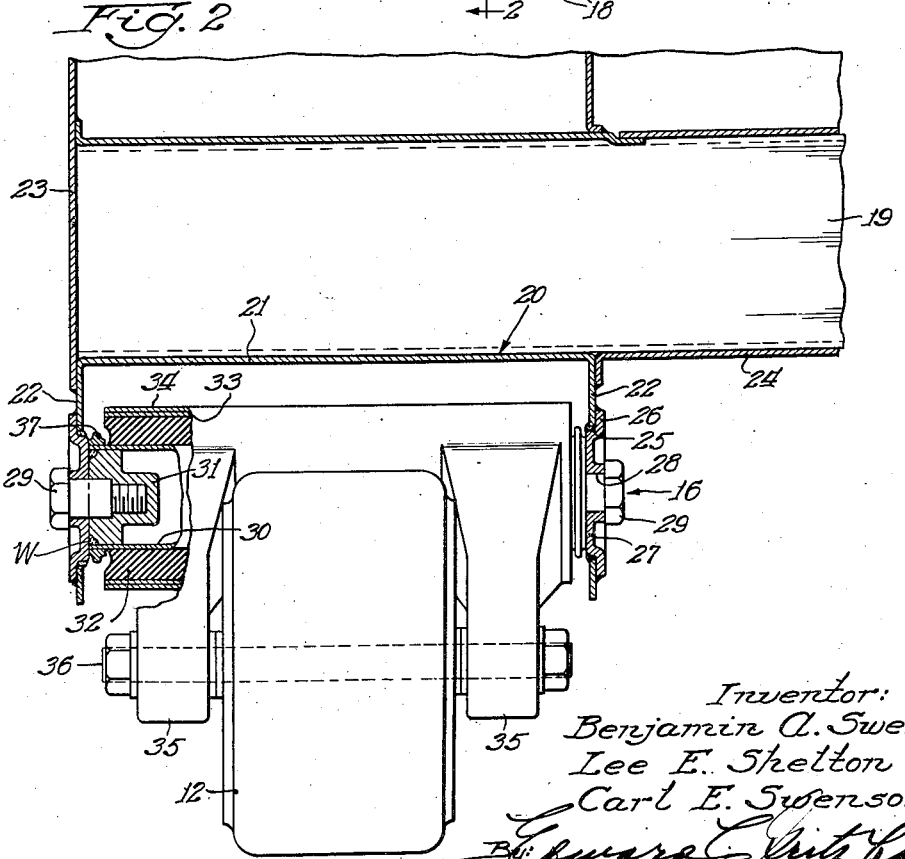
Inventor:
Benjamin A. Swennes
Lee E. Shelton and
Carl E. Swenson.

Inventor:
Benjamin A. Swennes
Lee E. Shelton and
Carl E. Swenson.
By Edward Fitzbaugh
Atty.

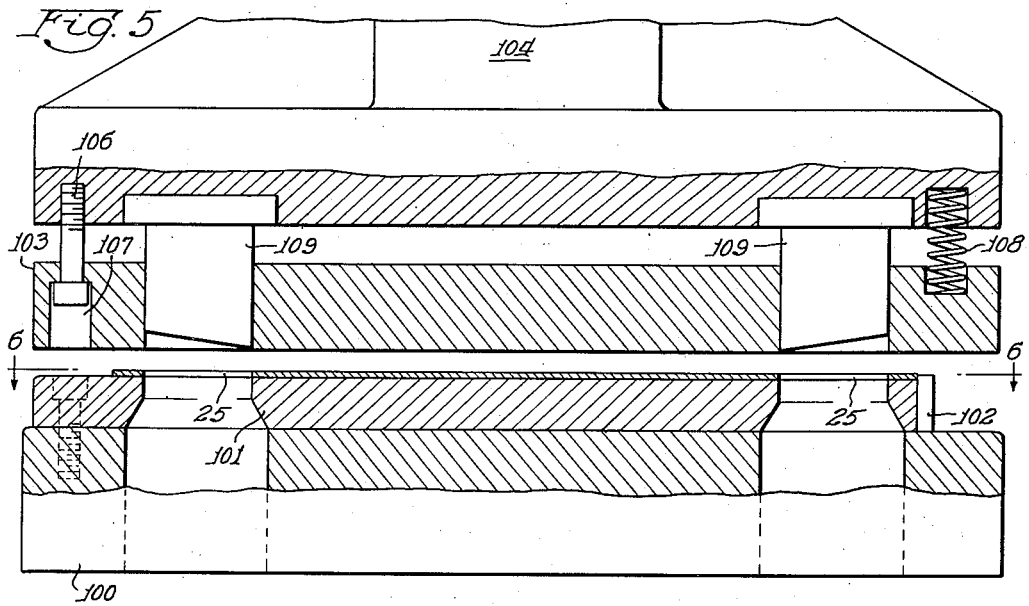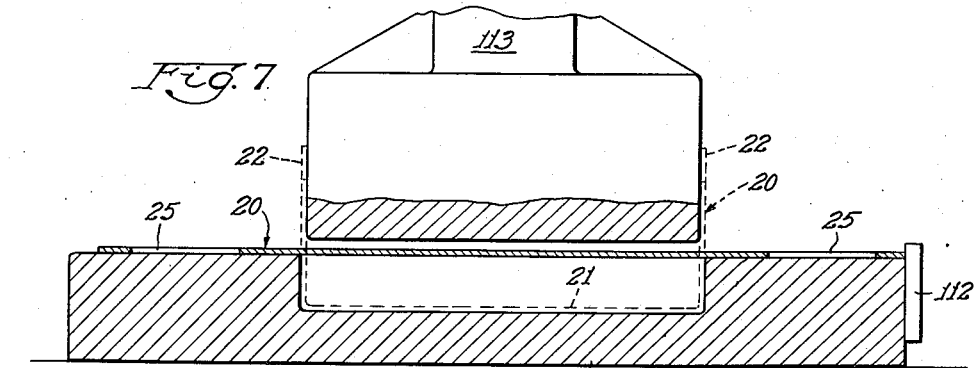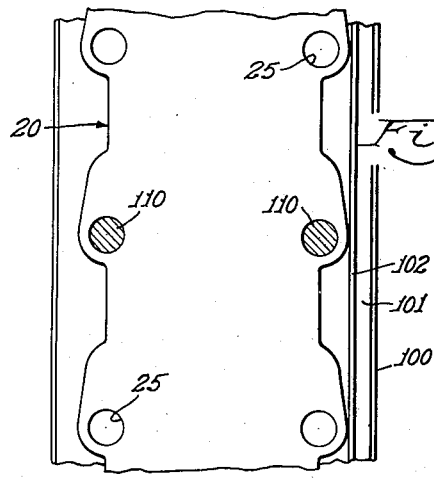

Patented Jan. 25, 1949

2,459,975

UNITED STATES PATENT OFFICE 2,459,975

WHEELS FOR ENDLESS TRACK VEHICLES AND METHOD FOR MOUNTING SAME

Benjamin A. Swennes, Rockford, Ill., Lee E. Shelton, Kalamazoo, Mich., and Carl E. Swenson, Rockford, Ill., assignors, by mesne assignments, to the United States of America as represented by the Secretary of the Navy Application April 5, 1944, Serial No. 529,628

8 Claims. (Cl. 180—9.1)

Our invention relates to motor vehicles and more particularly to such vehicles of the track laying or crawler type.

Track laying vehicles are provided on opposite sides thereof with endless articulated tracks which support the vehicle and propel it. Each of the tracks extends around and is held in looped configuration by a plurality of wheels on the respective side of the vehicle. The wheels on each side comprise a plurality of bogie wheels, which are disposed in tandem on the bottom of the vehicle and are preferably yieldably connected with the vehicle body, and other wheels on the vehicle body disposed above the bogie wheels for completing the track loop.

In prior vehicles of this type, in order to fix the bogie wheels in place, spaced flanges were separately fixed to the vehicle on each side thereof on the bottom of the vehicle, holes were then drilled through the flanges for receiving hub members of the bogie wheels, and then the bogie wheels were fastened in place with use of hub members in these holes. It was found with such a construction and method of fixing the bogie wheels in place that, due to errors in drilling the holes, the bogie wheels were many times mounted in unaligned relationship with each other. It is an object of the present invention to provide a construction and method for mounting the bogie wheels in place which are such that the bogie wheels are easily put into alignment. To this end it is an object of our invention to provide a channel on each side of the vehicle which has been preliminarily punched with holes for receiving bogie wheel hub members before being bent into the form of a channel whereby the holes are correctly positioned in the blank relative to each other, and to utilize hub members having portions smaller in size than the holes so that they may have limited movement in the respective holes. It is contemplated that any small adjustments of the bogie wheels may be made by adjustably moving the hub members in their respective holes, and the hub members may be welded to the sides of the channels for finally fixing the bogie wheels in their correct relative positions.

In prior vehicles of this type, the wheels on each side of the vehicle disposed above the bogie wheels and completing the track loop were adjusted to be in alignment with each other and with the bogie wheels by means of shims. Adjusting these wheels in this manner proved to be a time consuming task, and it is an object of our invention to provide a construction and method whereby such wheels may be easily and quickly aligned with the other wheels. To this end it is an object of our invention to provide such a wheel with a hub member having a cylindrical flange and to provide a cylindrical flange formed on the body of the vehicle adapted to loosely receive the first flange, whereby the hub member and wheel may be moved toward or away from the vehicle body or may have skewed movement with respect to the vehicle body with the one flange moving inside the other to bring the wheel into alignment with the other wheels prior to suitably fixing the flanges together to permanently fix the wheel in position.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a side elevational view of a track laying vehicle embodying the principles of the invention;

Fig. 2 is a cross-sectional view on an enlarged scale taken on line 2—2 of Fig. 1;

Fig. 5 is a sectional view of an apparatus for punching holes in a wheel-mounting channel blank of the vehicle body;

Fig. 6 is a view taken on the line 6—6 of Fig. 5; and

Fig. 7 illustrates an apparatus utilized to bend the blank into the channel.

Like characters of reference designate like parts in the several views.

Figure 3:
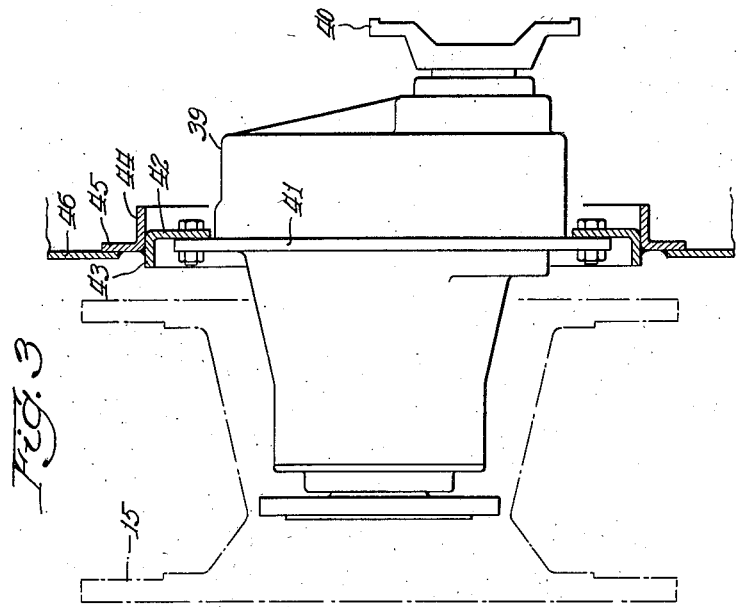
Fig. 3 is a cross sectional view on an enlarged scale taken on line 3—3 of Fig. 1.

Referring now to the drawings, the track laying vehicle illustrated comprises a water tight vehicle body 10 having a pair of endless articulated vehicle propelling tracks 11 disposed on opposite sides thereof. The track on each side of the vehicle is held in looped configuration by means of bogie wheels 12 disposed in tandem on the bottom of the vehicle, idler wheels 13 and 14 and a driving sprocket wheel 15. Each of the bogie wheels 12 is swingingly and yieldingly connected by a torsion joint 16 with the vehicle body 10 as will be hereinafter more specifically described. The sprocket wheel 15 is connected with the body 10 with a construction which will also be hereinafter more specifically described, and the wheels 15 on both sides of the vehicle are connected by any suitable mechanism to be driven by a motor 17 in the vehicle. The vehicle illustrated is of the amphibian type and is provided with lugs or grousers 18 on the tracks 11, so that the tracks may function to drive the vehicle through the water. The vehicle as so far described is of the type illustrated in the co-pending application of Benjamin A. Swennes, Serial No. 508,304, filed October 30, 1943, now Patent No. 2,456,542, dated Dec. 14, 1948, and this application may be referred to for a disclosure of certain details, such as details of the mechanism connecting the motor 17 with the track driving sprockets 15 or details of the shape of the grousers 18.

An improved method and construction are utilized for connecting and fixing the bogie wheels 12 with respect to the body 10 of the vehicle. The body 10 comprises a plurality of cross beams or channels 19, as shown. A channel 20 comprising a web 21 and channel sides 22 is fixed to the cross beams 19 adjacent each of the sides 23 of the body 10 (one side only being shown in the drawings) to form, with the bottom plates 24, the bottom of the body 10. The channel 20 is provided with oppositely disposed holes 25 in its sides 22, and a hub plate 26 having an overall diameter larger than the holes and having a boss portion 27 smaller in diameter than the holes to fit loosely therein, is provided over each of the holes 25 with its boss portion 27 being disposed in the hole. Each of the hub plates 26 is welded in its respective hole 25, as shown.

Each of the hub plates 26 is provided with a central hole 28, and the joint 16 for a bogie wheel 12 is fixed with respect to each of a pair of oppositely disposed hub plates 26 by means of bolts 29 extending through the holes 28 in the hub plates. The joint 16 comprises an inner cylinder 30 fixed with respect to a hub 31 in each end thereof by a weld W, and a screw 29 extends into each of the hubs 31 as shown. A cylindrical member 32 of a yielding material such as rubber is disposed on the cylinder 30, and a cylinder 33 is disposed over the member 32. The member 32 is fixed with respect to both the cylinders 30 and 33 by any suitable means as by vulcanizing. An outer cylinder 34 is disposed over the cylinder 33 and is fixed thereto by any suitable means, and the cylinder 34 carries a pair of spaced arms 35 between which is rotatably disposed a bogie wheel 12 by means of a shaft 36 extending between the arms. The cylinder 30 is fixed against rotation with respect to the sides 22 of the channel 20 by means of reaction arms 37 anchored with respect to the channel side 22 by any suitable means. For details of construction for fixing the cylinders 33 and 34 together and for anchoring the arms 37 to the channel sides, the copending application, Benjamin A. Swennes, Serial No. 510,296, filed November 15, 1943, now Patent No. 2,444,759, may be referred to. The cylinder 30 is held stationary with respect to the body 10 while the cylinder 33 is fixed with respect to the arms 35 and the wheel 12, and the member 32 of yielding material between the cylinders functions to allow yielding and swinging movement of the arms 35 and wheel 12, as is apparent.

In assembling the bogie wheels 12 in tandem relationship on each side of the body 10, the member 20 in the form of a flat sheet metal piece having parallel sides is first provided. The holes 25, while the member 20 is still unbent, are then punched into the member by conventional means, such as the apparatus disclosed in Figs. 5 and 6. More particularly the apparatus comprises a bedplate 100 having mounted thereon a die 101. At one side of the die is disposed a gauge 102 against which is seated the edge of the flat blank 20 for the purpose of properly positioning the blank 20 so that in the punching operation the holes 25 in the blank 20 will be disposed equidistantly from the adjacent edge thereof. Disposed above the blank 20 is a pressure pad 103 movably connected to a ram 104 by means of a bolt 107 threaded into the ram 104 and having its head disposed in an elongate aperture 107 in the pressure pad 103. Springs 108 extend between the ram and pressure pad and have their opposite ends received within openings in the ram and pad. Upon downward movement of the ram 104, the pressure pad under the influence of the springs 108 will contact the blank 20 and securely hold the blank in position before and during the punching operation. The ram 104 is provided with a plurality of punches 109 which, upon downward movement of the ram 104, will punch out holes 25 in the member 20. As shown in Fig. 6, the die 101 is provided with a pair of pins 110 adapted to be received in holes 25 at a point remote from the punches 109 so that upon progressive movement of the member 20, each pair of holes 25 will be equidistantly spaced from the other pairs of holes 25. It will be appreciated that by this method of procedure it is relatively simple to locate the holes 25 directly opposite each other. The member 20 is then bent along lines parallel to its parallel sides to form it into the channel as it is shown in Fig. 2, by means of the apparatus shown in Fig. 7 wherein the member 20 is disposed upon a die 111 and has one edge positioned against a gauge 112, a punch 113 being disposed above the member 20 and adapted upon downward movement to form it into the channel as indicated in dotted lines in Fig. 7. The member is then put into place on the bottom of the vehicle and is welded to the channels 19, the adjacent side 23 and the bottom plates 24 of the body 10. Hub plates 26 are then loosely positioned in opposite holes 25, with the boss portions 27 extending into the holes; and torsion units 16 are then put into place by means of the bolts 29. The units 16 are then aligned with each other whereby the central axes of the units extend substantially parallel with each other and perpendicular to the sides 22 of the channel 20, and such adjustable movement of the units 16 is permitted by the loose fit of the boss portions 27 in the holes 25. When each of the bogie wheels 12 has thus been properly positioned and adjusted with respect to the other bogie wheels, then the hub plates 26 for the bogie wheels are welded to the channel sides 22.

It will be apparent, with my improved construction and method for mounting the bogie wheels 12, that they may be easily and accurately mounted, due in particular to the fact that the holes 25 are formed in each of the channels 20 before it is bent into channel form and due to the fact that the hub plates 26 fit loosely in the holes 25 to allow limited movement of the plates with respect to the holes before being welded in place.

Figure 4:
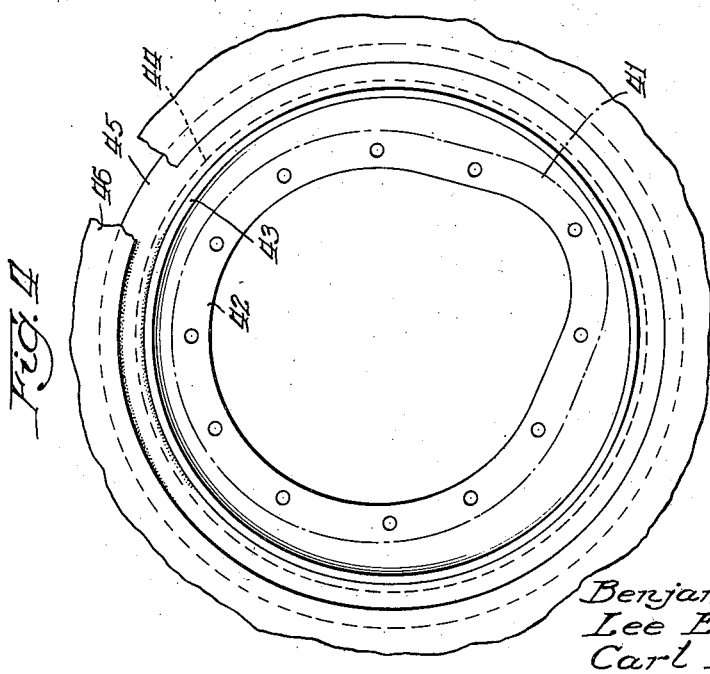
Fig. 4 is a side elevational view of the construction shown in Fig. 3 with certain parts being omitted for clearness of illustration.

Each of the track driving sprockets 15 is rotatably disposed with respect to and is driven by a gear reduction unit 39 (see Figs. 3 and 4), and each of the units 39 is adapted to be driven by any suitable means including, for example, a universal joint 40. Each of the gear units is provided with an outwardly extending flange 41, and a hub member 42 is bolted to the flange 41. The member 42 is provided with a cylindrical flange 43 the axis of which extends substantially parallel with the axis of the wheel 15. The flange 43 fits loosely in a cylindrical flange 44 provided on an angle iron 45 which is bent into a circle and is welded to a sheet metal side portion 46 of the body 10 about an opening substantially the same size as the angle iron in the body portion 46. The axis of the cylindrical flange 44 also extends substantially parallel with that of the sprocket wheel 15 and normal to the body portion 46 as will be noted. The cylindrical flanges 43 and 44 are welded together, as shown, to fix the gear unit 39 and the associated sprocket wheel 15 in place with respect to the body 10.

In mounting each of the sprocket wheels 15 and its associated gear unit 39 with respect to the vehicle body 10, the flanged hub member 42 is first bolted to the gear unit 39 and the angle iron 45 is welded to the body portion 46. The sprocket 15 and gear drive unit 39 are then put into place. The cylindrical flange 43 has an outer diameter sufficiently smaller than the inner diameter of the flange 44 so that the flange 43 has such a loose fit with the cylindrical flange 44 that the sprocket 15 may be moved, along with the gear unit 39, toward or away from the body portion 46 or the sprocket may be given a skewed or cocking movement with respect to the body portion.

The sprocket wheel 15 may thus be moved as desired with respect to the body portion 46 with the flanges 43 and 44 being one within the other, and the sprocket wheel is moved to be in the same plane as the other wheels 12, 13 and 14 on the same side of the vehicle, so that the tracks 11 on that side move continuously in that plane. After the sprocket wheel 15 has been so positioned, the flanges 43 and 44 are welded together to fix the wheel in its proper place.

It will be apparent that, due to the cylindrical flanges 43 and 44, which have a loose fit therebetween, the sprocket wheel 15 on each side of the vehicle may be adjusted as desired to bring it in the same plane as the other wheels on that side of the vehicle and may be fixed in such position, regardless of the fact that the body portion 46 may not extend exactly in a plane parallel to that of the tracks 11 or may be unduly close to or far from the longitudinal center of the body 10, due to manufacturing tolerances.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

1. In a method of mounting a plurality of vehicle supporting bogie wheels in tandem on a vehicle body, the steps which comprise, utilizing a sheet metal blank having two opposite parallel sides, punching out pairs of holes adjacent said opposite sides of the blank, thereafter bending said blank into the shape of a channel with said holes being oppositely disposed in the sides of the channel, fixing the channel to the bottom of the vehicle, and fixing hub portions into said holes and mounting the bogie wheels with respect to the hub portions.

2. In a method of mounting a plurality of vehicle supporting bogie wheels in tandem on a vehicle body, the steps which comprise, utilizing a sheet metal blank having two opposite parallel sides, punching out pairs of holes adjacent said opposite sides of the blank, thereafter bending said blank into the shape of a channel with said holes being oppositely disposed in the sides of the channel, fixing the channel to the bottom of the vehicle body, utilizing hub plates each larger in diameter than said holes and having a boss portion smaller in diameter than the holes and adapted to loosely fit therein, positioning the hub plates over said holes with their boss portions in the holes and fixing said wheels with respect to the hub plates in opposite holes, adjusting the positions of said wheels by means of the boss portions of the hub plates moving in said holes so that the wheel axes extend parallel to each other, and fixing the hub plates with respect to the sides of the channel after the wheels have been so adjusted.

3. In a method of mounting a plurality of wheels in tandem on a vehicle body, each of said wheels being connected with and disposed on parallel axes with a swingable and yieldable joint, the steps which comprise, utilizing a blank of sheet metal having two opposite parallel sides, punching out pairs of holes adjacent said opposite sides, thereafter bending said blank into the shape of a channel with said holes being oppositely disposed in the sides of the channel, fixing the channel to the bottom of the vehicle body, utilizing hub plates larger in diameter than said holes and having boss portions smaller in diameter than said holes and adapted to loosely fit in the holes, positioning said hub plates over said holes with the boss portions thereof fitting in the holes and fastening the joints of the vehicle wheels to opposite pairs of hub plates, movably adjusting said joints so that they are disposed on parallel axes substantially perpendicular to the sides of said channel with the boss portions of the hub plates moving in said holes, and welding said hub plates to the sides of said channel after said joints have been so adjusted.

4. In a vehicle, the combination of a vehicle body, a plurality of vehicle-supporting and propelling wheels mounted on each side of said body in the same plane with each other, the means for mounting one of said wheels on each side of said body including a hub portion with respect to which said wheel is rotatably disposed and a vehicle body portion having an opening therein receiving said hub portion, one of said portions having a peripheral flange engaging the periphery of the other of said portions, and means for fixing the peripheral flange of said one portion to the periphery of the other portion.

5. In a vehicle, the combination of a vehicle body, a plurality of vehicle-supporting and propelling wheels mounted on each side of said body in the same plane with each other, the means for mounting one of said wheels on each side of said body including a hub portion with respect to which said wheel is rotatably disposed and a portion fixed with respect to said body and having an opening therein larger than said hub portion for receiving the latter, said hub portion and said body portion extending approximately parallel with the axis of said wheel, and means for fixing said portions together to fix the wheel with respect to said body.

6. In a vehicle having a vehicle body, a pair of endless articulated vehicle-propelling tracks on opposite sides of said body, a plurality of wheels mounted on each side of said body and including vehicle-supporting wheels on the bottom of the body disposed in tandem, an idler wheel adjacent one end of the body and a driving sprocket wheel adjacent the other end of the body, said idler and sprocket wheels being disposed above said vehicle-supporting wheels, the wheels on each side of said body having a track disposed therearound and holding the track in looped configuration, the combination therewith of means for mounting each of the driving sprocket wheels to the body including a final gear drive unit on which the sprocket wheel is mounted, a hub portion disposed about and fixed to said final gear drive unit and having a peripheral flange extending substantially parallel with the axis of the sprocket wheels, a portion fixed with respect to the body and having an opening therethrough and having a cylindrical flange about its opening extending substantially normal to the body, said last-named cylindrical flange being larger than the cylindrical flange of said hub portion and receiving the same, said flanges being disposed with respect to each other to position the sprocket wheel in the plane of the other wheels, and means for fixing said cylindrical flanges together to fix the wheel with respect to the body.

7. In a vehicle, the combination of a vehicle body, a plurality of vehicle-supporting and propelling wheels mounted on each side of said body in the same plane with each other, and means for mounting one of said wheels on each side of said body including a hub portion with respect to which said wheel is rotatably disposed and a vehicle body portion having an opening therein for receiving said hub portion, one of said portions having a peripheral flange extending approximately parallel with the axis of said wheel, and means for fixing the peripheries of said two portions together.

8. In a vehicle, the combination of a vehicle body, a plurality of vehicle-supporting and propelling wheels mounted on each side of said body in the same plane with each other, and means for mounting one of said wheels on each side of said body including a hub portion with respect to which said wheel is rotatably disposed and a vehicle body portion having an opening therein for receiving said hub portion, one of said portions having a peripheral flange extending approximately parallel with the axis of said wheel, and means for fixing the peripheries of said two portions together, said peripheral flange permitting preliminary adjustment of said wheel into said plane before being fixed with respect to said body.

BENJAMIN A. SWENNES.
LEE E. SHELTON.
CARL E. SWENSON.

REFERENCES CITED

The following references are of record in the file of this patent:

UNITED STATES PATENTS

| Number    | Name         | Date           |
|-----------|--------------|----------------|
| 1,437,092 | Clark        | Nov. 28, 1922  |
| 1,673,875 | Knox         | June 19, 1928  |
| 1,877,653 | Fageol       | Sept. 13, 1932 |
| 1,907,910 | Wahlberg     | May 9, 1933    |
| 1,911,061 | Clark        | May 23, 1933   |
| 1,944,393 | Baker et al. | Jan. 23, 1934  |
| 1,947,756 | Cadman       | Feb. 20, 1934  |
| 2,093,456 | Knox         | Sept. 21, 1937 |
| 2,149,297 | Knox         | Mar. 7, 1939   |
| 2,162,198 | Herrington   | June 13, 1939  |
| 2,174,915 | Dietrich     | Oct. 3, 1939   |
| 2,177,991 | Maddock et al. | Oct. 31, 1939 |
| 2,242,570 | Dafoe        | May 20, 1941   |
| 2,245,595 | Knox         | June 17, 1941  |
| 2,376,720 | Pflager      | May 22, 1945   |

FOREIGN PATENTS

| Number  | Country  | Date          |
|---------|----------|---------------|
| 389,123 | Germany  | Jan. 25, 1924 |